United States Patent Office 2,955,915
Patented Oct. 11, 1960

2,955,915

PRODUCTION OF ALUMINA HYDROGEL

Edward J. Bicek, La Grange, Ill., assignor, by mesne assignments, to Universal Oil Products Company, Des Plaines, Ill., a corporation of Delaware No Drawing. Filed May 19, 1958, Ser. No. 735,975

7 Claims. (Cl. 23—143)

The present invention relates to an improvement in the process of manufacturing an alumina hydrogel, in which process hexamethylene tetramine is admixed with an alumina hydrosol, the mixture subsequently being subjected to temperatures of about 95° C. to about 100° C. The present invention is specifically directed to a novel method of producing an alumina hydrogel comprising Bayerite alumina in major proportions, which method employs lesser quantities of the relatively expensive hexamethylene tetramine.

Alumina, as porous aluminum oxide either in one of its many anhydrous forms, or as aluminum oxide hydrate or aluminum hydroxide, is widely employed throughout the chemical and petroleum industries. Alumina is used as a dehydrating, treating or purifying agent, and is often combined with other refractory inorganic oxides including silica, magnesia, thoria, boron oxide, zirconia, titania, mixtures of the same, etc. Various physical modifications of the previously mentioned forms of alumina are known as activated alumina or activated alumina of commerce, and are especially employed for their pronounced catalytic activity and adsorptive capacity.

Alumina, or aluminum hydrate, exists in various modifications, all of which exhibit different physical properties. Alpha-alumina, known as corundum, is the form of alumina which is stable at high temperatures and finds widespread use as an exceptionally good high-temperature refractory material; gamma-alumina is the form of alumina which is very stable at moderate temperatures, but undergoes a physical change to alpha-alumina at a temperature in excess of about 1800° F. Gamma-alumina is especially suitable either for use as a catalytically active carrier material for other catalytically active components, or as a particular type of catalyst within itself. Epsilon-alumina is that modification of alumina which exists as a thin film on the surface of metallic aluminum, and results from oxidation by wet air or oxygen; it is effective as a protective coating, inhibiting the further attack of the metallic aluminum underneath.

The following alumina hydrates, or aluminum hydroxides, are common, and may be prepared in the laboratory;

Gibbsite, or the alpha tri-hydrate, may be prepared by aging Bohmite in a cold alkaline solution.

Bayerite, or the beta tri-hydrate, is also formed by aging Bohmite in a cold basic solution, but is unstable and gradually is transformed into Gibbsite.

Diaspore, or the beta mono-hydrate, occurs abundantly in nature. Bohmite, or the alpha mono-hydrate, may be prepared in a variety of ways, one of the simplest being to add ammonium hydroxide to a water solution of aluminum chloride. The material originally precipitated is thought to be an amorphous alumina flock which rapidly grows in crystal size yielding crystalline Bohmite. Aging Bohmite in ammonium hydroxide solution transforms the Bohmite first to meta-stable Bayerite and finally to the stable Gibbsite. Bohmite may also be prepared from Bayerite alumina by contacting the latter with hot water.

As hereinbefore set forth, alumina exists in many forms; of these, gamma-alumina is the preferred form for utilization as a catalytically active carrier material; further, gamma-alumina, particularly that which is derived from hydrated aluminas rich in the Bayerite modification, yields an exceptionally active anhydrous alumina possessing a greater degree of activity than alumina which has been resolved from hydrated alumina rich in the Bohmite modification.

Whatever modification of alumina is employed, for the purpose of serving a particular function, the utilization thereof in substantially spherical or spheroidal shape offers numerous advantages, especially when the alumina is employed as an adsorbent, treating, refining, or purifying agent, or as a catalyst or component of a catalyst for the conversion of organic compounds, hydrocarbons and mixtures of hydrocarbons. When employed as a fixed bed in a reaction or contacting zone, particles which are spherically shaped permit a more uniform packing, thereby reducing variations in the pressure drop through said fixed bed, and the channeling which normally occurs with the result that a portion of the bed is by-passed.

Another advantage afforded the utilization of spheroidal shaped alumina particles is that said alumina particles contain no sharp edges to wear or break off during processing or handling and, therefore, the tendency to plug process equipment is reduced. These particular advantages are greatly magnified when the alumina particles are employed in a moving bed, that is, when the particles are transported from one section to another by either the reactants or by an extraneous carrying medium.

A previous method of manufacturing alumina particles, of substantially spherical shape was by means of a pilling operation performed on powdered, anhydrous alumina. Recently, spheroidal alumina of uniform size and shape, and uniformity of physical characteristics has been obtained by dispersing an alumina sol, in the form of droplets, into a suitable gelling medium, and immediately thereafter subjecting the resulting alumina hydrogel spheroids to an aging treatment. Generally, a complete aging treatment comprises aging the formed hydrogel spheroids in hot oil for a period of at least 10 hours, aging in a suitable liquid alkaline medium at least 10 hours, and finally, washing with water to reduce the concentration of the alkaline medium, and to impart to the alumina spheres additional desired physical characteristics.

Recently, continuous processes for forming and aging of alumina particles have been developed, employing, as the starting material, an alumina sol which is generally prepared by digesting substantially pure aluminum metal with an aqueous solution of similarly substantially pure hydrogen chloride. Extensive investigations have been conducted on these continuous processes for the manufacture of spherical alumina particles. The method of passing droplets of an alumina hydrosol into an immiscible liquid has developed as a result of such investigations. These investigations have also shown that alumina particles are not as readily manufactured by this method as are some other inorganic oxide particles such as, for example, silica spheres. In order to obtain acceptable spherical particles of alumina, it has been found necessary to employ a sol which will not set to a hydrogel until after some time interval has elapsed. For example, when adding a conventional precipitating reagent such as ammonium hydroxide to an aluminum salt, a gelatinous precipitate set immediately, and therefore, due to the extended time required for handling, cannot be formed into the desired spherical shape by the oil-drop mode of operation. It has been found, however, that said alumina particles may be manufactured by this method provided certain critical processing limitations are observed.

Alumina particles may be manufactured by the oil-drop method through the use of a process which comprises commingling an alumina sol with hexamethylene tetramine, a weak base having a strong buffering action at a pH of from about 4 to about 10, and which possesses an increased rate of hydrolysis at an increased temperature without the evolution of gas. The resultant mixture is then passed, in the form of droplets, into an oil bath maintained at elevated temperature.

As hereinbefore stated, the hexamethylene tetramine has an increased rate of hydrolysis at an increased temperature without exhibiting the rapid evolution of gas. This permits commingling the hexamethylene tetramine with the alumina sol at normal temperatures without immediately precipitating a gelatinous mass. Upon heating the mixture to an elevated temperature of from about 95° C. to about 100° C., the hexamethylene tetramine decomposes to form ammonia which causes the alumina to set to a gel and permits forming alumina hydrogel spheres. The use of hexamethylene tetramine produces alumina hydrogel spheroids which are uniform in size and shape, and which possess uniformity of physical characteristics.

The release of ammonia from the hexamethylene tetramine, in the alumina hydrosol-hexamethylene tetramine mixture, is a relatively slow reaction at comparatively low temperatures. Inherently, this offers an advantage in permitting the mixtures to be stored for extended periods of time without experiencing premature precipitation. Conversely, elevated temperatures, and long reaction times are required to produce suitable gellation of the alumina hydrosol. The utilization of the high temperatures has the disadvantage of producing an ultimate alumina product of high density, and possessing low surface area per gram of material. If, utilizing the same alumina hydrosol-hexamethylene tetramine mixture, lower temperatures could be employed, while maintaining relatively the same short reaction time, the resulting alumina would be of low density, possessing a high surface area per gram. Further, at the lower temperatures it is virtually impossible to obtain Bayerite, the beta-trihydrate modification of gamma-alumina, aluminum oxide in substantial proportions. An object of the present invention is to permit the utilization of temperatures lower than heretofore permissible, producing thereby a low-density alumina hydrogel containing major proportions of the Bayerite modification, and possessing high surface area per gram.

A further object of the present invention is to permit the gellation, sphere-forming and subsequent aging treatments to be effected without the use of excessive quantities of the relatively expensive hexamethylene tertamine usually required to provide the amount of ammonia necessary for suitable gellation and subsequent aging.

In one embodiment, the present invention provides an improvement in the process of producing an alumina hydrogel, utilizing a mixture of an alumina hydrosol and hexamethylene tetramine, and elevated temperatures in effecting the gellation of said mixture, which improvement comprises commingling a nitrogen-containing hydrochloride with the alumina hydrosol-hexamethylene tetramine mixture.

In another embodiment, the present invention provides a method for the production of a Bayerite-containing alumina hydrogel which comprises adding a water-soluble nitrogen-containing hydrochloride to a mixture of alumina hydrosol and hexamethylene tetramine, and heating said mixture at a temperature within the range of from about 40° C. to about 90° C.

In a specific embodiment, the present invention provides an improvement in the process of producing an alumina hydrogel, wherein elevated temperatures are employed to effect the gellation of an alumina hydrosol-hexamethylene tetramine mixture, which improvement comprises commingling a nitrogen-containing hydrochloride selected from the group consisting of hydroxylamine hydrochloride, melamine hydrochloride, hydrazine hydrochloride, phenylhydrazine hydrochloride, cyanogen hydrochloride, amino-acetonitrile hydrochloride and primary and secondary alkyl amine hydrochlorides with said mixture, and heating the resulting mixture at a temperature within the range of from about 40° C. to about 90° C.

The nitrogen-containing hydrochloride is reactive with the formaldehyde resulting from the decomposition of hexamethylene tetramine, in the presence of water, and removes the same from the equilibrium which is conveniently illustrated by the following chemical equation:

$$(CH_2)_6N_4 + 6H_2O \rightleftharpoons 4NH_3 + 6HCHO$$

Through the mechanism of removing the formaldehyde, the equilibrium is shifted in the direction which favors the rapid release of ammonia, resulting thereby in a more rapid gellation, and subsequent aging, of the alumina hydrate. In addition, lesser quantities of the relatively expensive hexamethylene tetramine may be employed to produce the same quantity of ammonia required to cause gellation and effective aging of the resulting hydrogel spheroids.

Of greater benefit, is the fact that lower temperatures may be employed in the formation, gellation and aging procedures. Heretofore, it was deemed necessary to effect these operations at temperatures in excess of 95° C. An upper limit of about 100° C. was imposed in order to prevent the sudden expulsion of vapors, resulting in the severe rupture of the spheroids. The utilization of the method of the present invention permits the forming, gelling and aging procedures to be carried out at lower temperatures; in some instances, as low as 40° C. or slightly above normal room temperature. Further, the method of the present invention does not limit the forming and aging operation to a very narrow range of temperature, and thereby eliminates the necessity of expensive precision control of the operating temperature.

As hereinbefore stated, it is possible, at lower temperatures, to obtain an alumina hydrogel possessing different, more advantageous physical properties than is inherent in that alumina resulting from the high-temperature operation. The alumina, produced by the method of the present invention, is a low-density product having high surface area characteristics.

The alumina hydrosol, to be formed and gelled in accordance with the present invention, may be manufactured in any suitable manner. Where desired, other substances may be added thereto, or combined therewith, without becoming removed from the broad scope of the instant process. For example, other refractory inorganic oxides may be combined with the alumina, while existing as the hydrosol, and include silica, zirconia, boria, titania, strontia, thoria, mixtures of two or more, etc. When the ultimate use of the alumina sphere is to serve as the catalytically active carrier material for other catalytically active components, the addition of these components to the alumina prior to the formation and gellation of the latter is often advantageous. The alumina sol may be prepared, for instance, by the process which comprises digesting an excess of metallic aluminum with an aqueous solution of hydrogen chloride and/or hydrogen fluoride, when either combined chloride and/or combined fluoride are desired components of the final product.

Still other methods may be utilized to yield the alumina hydrosol, and include the electrolysis of an aqueous solution of an aluminum salt such as aluminum chloride, aluminum nitrate, etc.; and the digestion, at its boiling point, of a solution of aluminum chloride to which metallic aluminum has been added. It is understood that the method of the present invention is not limited unduly to any specific method of preparing the alumina hydrosol, including those methods hereinabove set forth. However, previous investigations have shown that a suitable alumina hydrosol, containing combined chloride, has the aluminum concentration adjusted to the extent that the aluminum to chloride weight ratio is about 1.2:1. The precise chemical composition of the aluminum-chloride sol is not known, but may be represented by the following formula:

$$xAl(OH)_3 \cdot AlCl_3$$

wherein "$x$" may be any number from about 4.0 to about 7.0.

The nitrogen-containing hydrochloride may be commingled with the mixture of alumina hydrosol and hexamethylene tetramine, prior to subjecting said mixture to forming and gellation. In many instances, it is preferred to comingle the alumina hydrosol with the nitrogen-containing hydrochloride prior to adding thereto the hexamethylene tetramine. It has been found that this method insures against the possibility of premature precipitation and/or setting of the alumina, as sometimes occurs when the hexamethylene tetramine solution is first added to the alumina hydrosol. Premature precipitation produces an alumina not of the Bayerite modification, and which exhibits the tendency to become stratified.

The exact quantities of hexamethylene tetramine and of the nitrogen-containing hydrochloride, to be commingled with the alumina hydrosol, are dependent upon the particular concentration of alumina within the sol. Generally, the weight ratio of alumina to hexamethylene tetramine is about 7.7:1; the nitrogen-containing hydrochloride is added in an amount sufficient to react with about 10% to about 90% by weight of the formaldehyde resulting from the decomposition of the hexamethylene tetramine. Through the use of the method of the present invention, it is possible to decrease the quantity of the hexamethylene tetramine necessary to effect suitable gellation to an amount below the usual weight ratio of alumina to hexamethylene tetramine of 7.7:1.

The following examples are introduced to further illustrate the novelty and utility of the present invention. It is understood that the present invention is not limited unduly to the conditions and concentrations therein employed.

The alumina hydrosol to be used in the examples, illustrating the method of the present invention, is prepared by digesting an excessive amount of aluminum metal in an aqueous solution of 12% by weight hydrogen chloride. The resulting alumina sol has an aluminum to chloride weight ratio of about 1.2:1. The sol is commingled with water to yield an alumina sol solution comprising 12% by weight aluminum.

*Example I*

The alumina oxychloride solution hereinabove described is treated with a water soluble amine hydrochloride, for example, methylamine hydrochloride, in an amount sufficient to effect a reaction with approximately 50% by weight of the formaldehyde formed from the decomposition of hexamethylene tetramine. The mixture is mildly agitated to comingle intimately the alumina-combined chloride hydrosol and the methylamine hydrochloride. This mixture is then cooled and combined with an approximately equal volume of a 30% by weight solution of hexamethylene tetramine, which solution has also been cooled to approximately room temperature. The ingredients are blended until the mixture is homogeneous, at which time said mixture is formed and subjected to gellation at a temperature of about 60° C. The resulting alumina hydrogen spheroids are then aged, as hereinbefore set forth, dried and calcined at elevated temperatures. The presence of methylamine hydrochloride, employed for the removal of the formaldehyde, permits the decomposition of hexamethylene tetramine to occur at a lower temperature, about 60° C., and in addition, reduces the tendency for the reverse reaction to occur, in which reaction the formaldehyde competes with the alumina oxychloride hydrosol for the ammonia released through the decomposition of the hexamethylene tetramine.

*Example II*

An aqueous solution of hydrazine hydrochloride is added to an alumina oxychloride hydrosol hereinabove described. To the resulting mixture is added an aqueous solution of hexamethylene tetramine in an amount to yield an alumina to hexamethylene tetramine weight ratio of less than 7.7:1. The hydrazine hydrochloride is present in an amount sufficient to react with approximately 50% by weight of the formaldehyde formed from the decomposition of the added hexamethylene tetramine. The resulting mixture is formed and subjected to gellation at a temperature of 60° C. The resulting hydrogel spheroids are aged as hereinbefore set forth, and are found to comprise gamma-alumina of the Bayerite modification in major proportions.

The anhydrous alumina spheres ultimately resulting from the hydrogel spheroids hereinabove produced, are low-density alumina spheres possessing high surface area characteristics. These physical properties permit the utilization of such spheres as the carrier material in the subsequent manufacture of catalysts, resulting in more thorough penetration of, and more uniform distribution within, the alumina by the catalytically active components combined therewith.

The above described examples are illustrative of a specific embodiment of the present invention. The advantages afforded the use thereof are readily ascertained by those skilled in the art of manufacturing alumina. Benefits are particularly afforded in those instances where the alumina is to be ultimately employed in the preparation of metal-containing catalysts.

I claim as my invention:

1. In the process of producing an alumina hydrogel through the utilization of a mixture of alumina hydrosol and hexamethylene tetramine, wherein formaldehyde is formed by decomposition of hexamethylene tetramine, the improvement which comprises commingling with the alumina hydrosol-hexamethylene tetramine mixture a nitrogen-containing hydrochloride selected from the group consisting of hydroxylamine hydrochloride, hydrazine hydrochloride, phenylhydrazine hydrochloride, cyanogen hydrochloride, aminoacetonitrile hydrochloride and primary and secondary alkylamine hydrochlorides, and gelling the resultant mixture at a temperature of from about 40° C. to about 90° C.

2. The improvement of claim 1 further characterized in that said nitrogen-containing hydrochloride is a primary alkylamine hydrochloride.

3. The improvement of claim 1 further characterized in that said nitrogen-containing hydrochloride is hydroxylamine hydrochloride.

4. The improvement of claim 1 further characterized in that said nitrogen-containing hydrochloride is hydrazine hydrochloride.

5. The improvement of claim 1 further characterized in that said nitrogen-containing hydrochloride is phenylhydrazine hydrochloride.

6. The improvement of claim 1 further characterized in that said nitrogen-containing hydrochloride is cyanogen hydrochloride.

7. The improvement of claim 1 further characterized in that the hydrochloride is added in an amount sufficient to react with about 10% to about 90% by weight of the formaldehyde resulting from the decomposition of hexamethylene tetramine.

References Cited in the file of this patent

UNITED STATES PATENTS

| | | |
|---|---|---|
| 2,666,749 | Hoekstra | Jan. 19, 1954 |
| 2,672,453 | Wankat | Mar. 16, 1954 |

OTHER REFERENCES

Introduction to Organic Chemistry, by A. Lowy et al., sixth ed. published by John Wiley and Sons, Inc. N.Y., October 1948 pp. 90, and 159 to 165.